US005683738A

United States Patent [19]
Gruetzmacher et al.

[11] Patent Number: 5,683,738
[45] Date of Patent: *Nov. 4, 1997

[54] LOW CALORIE FAT SUBSTITUTE

[75] Inventors: Gordon D. Gruetzmacher, Noank; Jeffrey W. Raggon, Uncasville; Bishop Wlodecki, Preston, all of Conn.

[73] Assignee: Cultor Ltd., Helsinki, Finland

[*] Notice: The term of this patent shall not extend beyond the expiration date of Pat. No. 5,498,910.

[21] Appl. No.: 583,378

[22] Filed: Jan. 5, 1996

[51] Int. Cl.⁶ ............................................. A23D 9/007
[52] U.S. Cl. ................................... 426/611; 426/804
[58] Field of Search ............................. 426/611, 804, 426/601

[56] References Cited

U.S. PATENT DOCUMENTS

| | | | |
|---|---|---|---|
| 3,600,186 | 8/1971 | Mattson | 426/804 |
| 4,973,489 | 11/1990 | Meyer | 426/601 |
| 5,158,796 | 10/1992 | Bernhardt | 426/549 |
| 5,458,910 | 10/1995 | Gruetzmacher | 426/804 |

FOREIGN PATENT DOCUMENTS 1457569  12/1976  United Kingdom .

*Primary Examiner*—Carolyn Paden
*Attorney, Agent, or Firm*—Ronald S. Courtney

[57] ABSTRACT

There is disclosed a low calorie fat substitute comprising a sorbitol fatty acid ester with a degree of substitution of about five fatty acid groups. Foodstuffs containing the sorbitol ester are also disclosed. Processes for preparing the sorbitol fatty acid esters are also disclosed.

60 Claims, No Drawings

LOW CALORIE FAT SUBSTITUTE

BACKGROUND OF THE INVENTION

The present invention relates to low calorie fat substitutes.

Continued concern with the health problems, e.g. obesity, arteriosclerosis, etc., associated with a diet high in fat content has led to new formulations of normally high-caloric fat-containing foods. These formulations are often referred to as "diet," "lite" and "low calorie" and are made by replacement of the normally present fat with non-fat ingredients such as air, water, or protein, etc., thereby reducing the fat content. Due to the reduction in fat content, there is often a corresponding reduction in the perceived quality of the food.

Another approach which has been suggested is to modify the fat to alter its absorption characteristics. This approach entails reducing the susceptibility of the fat to digestion by intestinal lipase enzymes; the theory being that if the fat is not absorbed, the material will be non-caloric. This approach of fat modification is referred to in a number of patents and patent applications.

U.S. Pat. No. 3,600,186 to Mattson refers to low calorie fat-containing food compositions wherein from about 10 percent to about 100 percent of the fat consists of a sugar fatty acid ester having at least 4 fatty acid ester groups or a sugar alcohol fatty acid ester which is completely esterified. One compound exemplified in the Mattson Patent is a mixed sucrose octaoleate. Since this compound was a liquid polyester, an undesirable anal-leakage effect was noted.

U.S. Pat. No. 4,005,195 refers to the combination of a liquid polyol polyester with an anti-anal leakage (AAL) agent. The AAL agents mentioned are edible $C_{12}$ and higher saturated fatty acids, sources of edible $C_{12}$ and higher saturated fatty acids and solid polyol fatty acid polyesters.

U.S. Pat. No. 4,005,196 refers to the combination of a liquid polyol fatty acid polyester, an AAL agent and fat soluble vitamins to overcome the undesirable vitamin depletion observed when liquid polyol polyesters are used as fat substitutes in foods.

U.S. Pat. No. 4,927,658 refers to certain trishydroxymethyl alkane ester derivatives, notably fatty acid and dicarboxylate-extended fatty acid esters of monomeric and dimeric trishydroxymethyl alkanes, as low calorie fat substitutes, or fat mimetics, as these modified fats in general are now called.

U.S. Pat. No. 4,927,659 refers to the use of certain fatty acid esters of trishydroxymethyl ethane and trishydroxymethyl propane as fat mimetics.

U.S. Pat. No. 4,959,466 refers to partially esterified polysaccharides (PEP) such as xanthan gum, guar gum, pectin, etc. transesterified with fatty acid methyl esters.

U.S. Pat. No. 2,962,419 refers to esters of neopentyl type alcohols such as pentaerythritoltetracaprylate as fat substitutes.

U.S. Pat. No. 3,579,548 refers to fat substitutes which are made by replacing the fatty acids attached to glycerol with alternate acids.

U.S. Pat. No. 3,495,011 refers to the administration of polyglycerols and polyglycerol esters as a means for lowering blood cholesterol.

U.S. Pat. No. 3,158,490 refers to a salad oil having 0.001% of a dissolved disaccharide ester.

U.S. Pat. No. 1,656,474 refers to an edible composition consisting essentially of ethyl margarate, glyceryl margarate and fat-soluble vitamins.

U.S. Pat. No. 3,353,966 refers to a salad oil containing an oligosaccharide or disaccharide esterified with a hydroxy fatty acid and a saturated fatty acid.

Patent Cooperation Treaty (PCT) Publication No. WO90/00012 refers to a fatty composition comprising a blend of a polyol fatty acid polyester and a glyceride fat having a specified steepness.

U.S. Pat. No. 4,810,516 refers to a reduced calorie chocolate confection comprising cocoa, an artificial sweetener, a carbohydrate bulking agent and a polyol fatty acid polyester.

U.S. Pat. No. 4,034,083 refers to a composition comprising a polyol fatty acid polyester and a fat soluble vitamin.

European Patent (EP) Publication No. 342,972 refers to comminuted meat products containing polyol fatty acid polyesters.

EP Publication No. 290,420 refers to shortening compositions containing polyol fatty acid polyesters having a certain melting point, liquid polyol fatty acid polyesters, and hardstock fat.

EP Publication No. 290,216 refers to the use of polyol fatty acid polyesters for the treatment of ulcers.

PCT Publication No. 90/00014 refers to a frying fat composition containing a glyceride fat and a polyol fatty acid polyester.

U.S. Pat. No. 4,849,242 refers to polyoxyalkylene fatty acid esters as low calorie fat substitutes.

EP Publication No. 348,196 refers to granola bars, popcorn clusters and other food pieces which are held together by a binder which is preferably a sucrose polyester.

EP Publication No. 236,288 refers to intermediate melting sucrose polyesters useful as low calorie fat substitutes.

PCT Publication No. WO 90/00013 refers to blends of nondigestible polyol fatty acid polyesters having a slip melting point of greater than 25° C. and a transition time of greater than 60 seconds.

U.S. Pat. No. 4,508,746 refers to a low calorie edible oil which is a tricarballylic acid esterified with saturated or unsaturated alcohols having straight or branched chains of from 8 to 30 carbon atoms.

U.S. Pat. Nos. 4,582,927 and 4,673,581 refer to certain diesters, e.g. hexadecyl dioleylmalonate and dihexadecyl dioleylmalonate, useful as low calorie fat substitutes.

U.S. Pat. No. 4,582,715 refers to certain alpha-acylated glycerides useful as low calorie fat substitutes.

U.S. Pat. No. 4,461,782 refers to baked products containing a non-absorbable non-digestible liquid polyol polyester, microcrystalline cellulose and a solid polyol polyester of a solid fatty acid as an AAL agent.

EP Publication No. 405874 refers to fatty acid diesters of various dihydric alcohols containing 4 to 10 carbon atoms and the use of the diesters as fat substitutes.

European Patent Publication No. 352907 refers to a fat substitute composition comprising a liquid polyol fatty acid polyester, at least 10% of a solid low calorie fat substitute and at least 1% of a cohesive network of polysaccharide fibrils and microfibrils by weight of the liquid polyester.

EP Publication No. 233856 refers to a low calorie fat substitute comprising (a) an edible, wholly or partially digestible fat material having specified properties, and (b) an edible food material, preferably an emulsifier, which acts as a solvent for the fat material.

U.S. Pat. No. 5,258,197 refers to low calorie fat substitutes comprising a triglyceride moiety substitutes with short chain and large fatty acids.

U.S. Pat. No. 5,458,910 refers to low calorie fat substitutes comprising a mixture of sorbitol tetra esters and sorbitol anhydrides.

U.S. Pat. No. 4,497,864 refers to a magnetic recording medium having ferromagnetic particles in a binder which contains at least one anhydrosorbitol di- and/or tetra-fatty acid non-hydroxy ester.

EP Publication No. 375239 refers to an emulsified salad oil dressing containing a mixture of a low calorie fat material and a triglyceride oil.

EP Publication No. 350981 refers to a hard fat substitute useful for confectionery manufacture, comprising a polyol fatty acid polyester having fatty acid residues derived from fully hardened vegetable oils.

EP Publication No. 350983 refers to fat substitutes comprising a blend of a polyol fatty acid polyester and a glyceride fat, with the blend especially useful in layered dough products.

EP Publication No. 350986 refers to a fat composition comprising a blend of a polyol fatty acid polyester and a glyceride fat, the fat composition exhibiting improved air entrapment upon whipping.

EP Publication No. 350987 refers to a fatty composition comprising a blend of polyol fatty acid polyesters having a slip melting point of above 25° C.

EP Publication No. 350988 refers to a frying fat composition comprising a blend of a non-digestible polyol fatty acid polyester and a glyceride fat with the blend having a specified slip melting point.

EP Publication No. 354600 refers to an edible fat-containing product comprising two distinct fat phases: a fat phase containing an edible polyol fatty acid polyester, and a fat phase consisting essentially of a digestible fat and an oil soluble vitamin, with a vitamin-impervious phase separating the two fat phases.

EP Publication No. 375031 refers to the use of non-fermentable dietary fibers as AAL agents.

EP Publication No. 377237 refers to low-calorie confectionery products wherein a substantial proportion of the fat material consists of indigestible polyol fatty acid polyesters.

EP Publication No. 378876 refers to low-calorie confectionery products containing indigestible polyol fatty acid polyesters, wherein at least 30% of the polyesters are unsaturated fatty acids trans hardened to a level of over 30%.

EP Publication No. 379747 refers to spreads containing a fat phase of indigestible polyol fatty acid polyester, glyceride fats, and a gelled aqueous phase. U.S. Pat. No. 3,649,647 refers to a mixed sugar alcohol ester of higher and lower saturated fatty acids which can be used as a cocoa butter substitute.

SUMMARY OF THE INVENTION

In one embodiment, the present invention is directed to a composition consisting of essentially of a sorbitol fatty acid ester with a degree of substitution of about 5 fatty acid groups derived from a mixture of fatty acids, said composition useful as a low calorie fat substitute, said composition showing a rate of lipase hydrolysis of from about 5% to about 30% of the rate of lipase hydrolysis of soybean oil.

Preferred are compositions wherein the degree of substitution ranges from about 4.5 to about 5.5 fatty acid groups, with an especially preferred degree of substitution of about 4.9.

Especially preferred are compositions containing esters of sorbitol in an anhydride form.

Especially preferred are compositions wherein the rate of lipase hydrolysis is about 12%.

Preferred are compositions wherein said fatty acid groups are selected from the group consisting of synthetic, natural, saturated, unsaturated, straight or branched chain fatty acids, and mixtures thereof.

Preferred are the compositions wherein said fatty acid groups of said fatty acid ester are selected from the group consisting of butyric, caproic, caprylic, pelargonic, capric, undecanoic, lauric, myristic, myristoleic, palmitoleic, ricinoleic, erucic, palmitic, stearic, arachidic, behenic, oleic, elaidic, linoleic, linolenic, eleostearic and arachidonic acids; fatty acid derivatives; and mixtures thereof.

Especially preferred are the compositions wherein said fatty acid groups are obtained from oils selected from the group consisting of non-hydrogenated, partially hydrogenated, and hydrogenated oils selected from the group consisting of soybean oil, safflower oil, sunflower oil, sesame oil, peanut oil, corn oil, olive oil, rice bran oil, rapeseed oil, canola oil, shea nut oil, babassu nut oil, coconut oil, palm kernel oil, cottonseed oil, and palm oil; butterfat, tallow and lard; and mixtures thereof.

Especially preferred are the compositions wherein said fatty acid groups are obtained from hydrogenated, partially hydrogenated, or non-hydrogenated soybean oil.

In another embodiment, the present invention is directed to a triglyceride-containing foodstuff having at least a portion of the normally present triglyceride replaced by one or more sorbitol fatty acid ester with a degree of substitution of about 5 fatty acid groups.

Preferred foodstuffs are those wherein the sorbitol fatty acid ester contains esters of sorbitol in an anhydride form. Preferred foodstuffs within which the sorbitol fatty acid ester replaces at least a portion of the normally present triglyceride are frozen desserts, salad dressings, or salad oils, dips for crackers, chips or vegetables, spreads, whipped toppings, triglyceride-containing confections, frostings or icings for cakes or cookies, fillings for cakes or cookies, whipped or gelled desserts, puddings, beverages, shortenings, frying oils, soups, baked goods, mayonnaise or imitation mayonnaise, liquid or dry imitation dairy products, liquid or plastic margarine spreads, gravies, sauces, pasta, sprays for cooking or frying, coatings for snack foods, and, meat, poultry, or fish analogues.

In another embodiment, the present invention is directed to a method of reducing the fat content of a foodstuff containing triglycerides comprising replacing at least a portion of the normally present triglycerides by a composition comprising a sorbitol fatty acid ester with a degree of substitution of about 5 fatty acid groups. Preferred is the method wherein at least a portion of said sorbitol fatty acid ester is in the anhydride form.

Preferred foodstuffs which have their fat content reduced by the method of the present invention are frozen desserts, salad dressings, dips for crackers, chips or vegetables, spreads, whipped toppings, triglyceride containing confections, frostings or icings for cakes or cookies, fillings for cakes or cookies, whipped desserts, gelled desserts, puddings, beverages, shortenings, frying oils, soups and baked goods, mayonnaise or imitation mayonnaise, liquid or dry imitation dairy products, liquid or plastic margarine spreads, gravies, sauces, pasta, sprays for cooking or frying, coatings for snack foods, and, meat, poultry, or fish analogues.

In another embodiment, the present invention is directed to a process for preparing a mixture of sorbitol fatty acid esters and sorbitol anhydride fatty acid esters with a degree of substitution of about 5 fatty acid groups comprising: heating a mixture of sorbitol, an alkali metal fatty acid soap, an excess, based on the weight of sorbitol, of a fatty acid alkyl ester, and a basic catalyst, to a temperature and for a time sufficient to effect the desired degree of esterification.

Preferred catalysts are alkali metal catalysts, with preferred alkali metal catalysts selected from the group consisting of alkali metals, alkali metal hydrides, alkali metal hydroxides, alkali metal alkoxides and alkali metal carbonates; and combinations thereof.

Especially preferred catalysts are selected from the group consisting of potassium metal, sodium metal, potassium hydride, sodium hydride, potassium hydroxide, sodium hydroxide, potassium methoxide, potassium ethoxide, potassium t-butoxide, sodium methoxide, sodium ethoxide, potassium carbonate and sodium carbonate; and combinations thereof.

Especially preferred catalysts are sodium carbonate and potassium carbonate.

Especially preferred fatty acid alkyl esters are fatty acid methyl esters.

In another embodiment, the present invention is directed to the sorbitol esters and sorbitol anhydride esters produced by the above process.

DETAILED DESCRIPTION OF THE INVENTION

Sorbitol is a six-carbon sugar alcohol which contains six hydroxyl groups available for esterification. The monoanhydride forms of sorbitol contain four hydroxyl groups available for esterification. In the present invention, sorbitol is esterified with fatty acids, on average, on about five of the hydroxyl groups. All sorbitol ester species, from triesters to hexaesters, are present in significant amounts, with the average degree of substitution being about 5. In some embodiments, triesters and tetraesters of sorbitol anhydrides are also present in significant amounts. By average degree of substitution of about 5 is meant that the degree of substitution of components of the sorbitol fatty acid ester as determined by High Pressure Liquid Chromatography (HPLC), when averaged according to the weight of each component, is within the range of from about 4.5 to about 5.5. Using the ester distribution of Example 3 below, the average degree of substitution is calculated as shown below.

| Component | Weight percent | Weight percent multiplied by degree of substitution |
| --- | --- | --- |
| Sorbitol and sorbitol anhydride triesters | 6.1 | 18.3 |
| Sorbitol tetraesters | 13.8 | 55.2 |
| Sorbitol anhydride tetraesters | 12.3 | 49.2 |
| Sorbitol pentaesters | 38.1 | 190.5 |
| Sorbitol hexaesters | 29.8 | 178.8 |
| Totals | 100.1 | 492.0 |

Average degree of substitution = 492.0 ÷ 100.1 = 4.9

The rate of lipase hydrolysis as determined for a soybean fatty acid ester of sorbitol with average degree of substitution 5.1 was 12.2% that of a fully caloric oil (Example 2). Taking into account the precision of the assay and variations in composition in the range claimed, the full range of this parameter is estimated to be about 5 to 30%, with a preferred range of from about 8 to about 20%.

The sorbitol fatty acid esters of the present invention show advantages over highly esterified polyol polyesters. By virtue of their partial esterification, the sorbitol esters are partially hydrolyzed by mammalian intestinal lipasea. While it is not intended that the invention be bound by theory, it is believed that nonmetabolizable fat substitutes such as the highly esterified polyol polyesters hinder absorption of fat-soluble vitamins and other lipophilic nutrients by partitioning them (i.e., extracting them) into the oil phase of the intestinal contents, and that this process is greatly diminished in the partially hydrolyzed sorbitol esters. It is further believed that anal leakage is minimized by the partially hydrolyzed esters, whose surfactant properties facilitate emulsification within the gastrointestinal tract.

As shown in U.S. Pat. No. 5,458,910, assigned to the present assignee, sorbitol tetraesters with a caloric availability of about 15% showed a rate of hydrolysis by a mammalian enzyme preparation (lipase) of about 20–24% of that of a fully caloric oil and did not cause anal leakage. As noted above, the rate of lipase hydrolysis of a sorbitol pentaester was about 12% that of a fully caloric oil, which is roughly half that of sorbitol tetraesters. Although only half as susceptible as the tetraesters to mammalian enzymes, pentaesters did not cause significant anal leakage or other gastrointestinal symptoms in humans. Thus, relative to the tetraesters, the pentaesters have the advantage of lower susceptibility to mammalian enzymes, and therefore of lower caloric value, with no significant increase in side effects.

In the present invention, sorbitol is esterified on about 5 of the hydroxyl groups with a fatty acid containing from about 4 to about 22 carbon atoms. Examples of such fatty acids include butyric, caprylic, caproic, capric, lauric, myristic, pelargonic, myristoleic, palmitic, palmitoleic, stearic, oleic, ricinoleic, undecanoic, linoleic, linolenic, eleostearic, elaidic, arachidic, arachidonic, behenic and erucic acid. The fatty acids may be naturally occurring or synthetic fatty acids; they may be saturated or unsaturated, including positional and geometrical isomers; they may be straight chain or branched chain fatty acids. Mixtures of fatty acids may also be used, such as those obtained from non-hydrogenated, partially hydrogenated, or hydrogenated soybean, safflower, sunflower, sesame, peanut, corn, olive, rice bran, canola, babassu nut, coconut, palm kernel, shea nut, cottonseed, rapeseed, or palm oil; or butterfat, tallow or lard.

The fatty acid may also be a fatty acid derivative such as, for example an alpha-acylated fatty acid as described in U.S. Pat. No. 4,582,715, an alpha-branched fatty acid as described in U.S. Pat. No. 3,579,548, or an extended fatty acid formed by reacting a fatty alcohol with a dicarboxylic acid. Examples of suitable dicarboxylic acids which may be reacted with the fatty alcohol to form said extended fatty acid are malonic, succinic, glutaric and adipic acids. The resulting extended fatty acids are, structurally, $ROCOCH_2COOH$ from malonic acid, $ROCO(CH_2)_2COOH$ from succinic acid, $ROCO(CH_2)_3COOH$ from glutaric acid, $ROCO(CH_2)_4COOH$ from adipic acid, and the like, where R is the fatty alcohol radical.

The sorbitol fatty acid ester may be prepared by a variety of methods well known by those skilled in the art. These methods include transesterification of sorbitol with methyl, ethyl or glycerol fatty acid esters using a variety of methods well known to those skilled in the art, acylation of sorbitol with a fatty acid chloride, acylation of sorbitol with a fatty acid anhydride and acylation of sorbitol with a fatty acid, mixtures of fatty acids, or a fatty acid derivative.

Depending on the method by which the sorbitol fatty acid ester is made, it contains varying proportions of esterified sorbitol anhydrides. For example, when esterification is carried out by acylation with a fatty acid chloride, the product contains very little or no sorbitol anhydride esters. In contrast, transesterification with fatty acid methyl esters under basic conditions results in a product in which about 15–20% of the sorbitol fatty acid esters are esters of sorbitol anhydrides.

Moreover, the process for preparing the mixture of sorbitol fatty acid esters and sorbitol anhydride fatty acid esters with an average degree of substitution of about 5 fatty acid groups also forms a part of the present invention. In this process, a mixture of sorbitol, an alkali metal fatty acid soap, an excess of a fatty acid alkyl ester and an appropriate catalyst is heated to a temperature, for example, from about 120° C. to about 180° C., and for a time, for example, about 4 hours, sufficient to effect the desired degree of esterification.

Preferred catalysts which may be used in the process of the present invention are basic catalysts such as, for example, alkali metal catalysts. Preferred alkali metal catalysts include potassium metal, sodium metal, potassium hydride, sodium hydride, potassium hydroxide, sodium hydroxide; alkali metal alkoxides such as potassium methoxide, potassium ethoxide, potassium t-butoxide, sodium methoxide, sodium ethoxide; and other alkali metal catalysts such as potassium carbonate and sodium carbonate, the latter two catalysts being especially preferred.

Preferred fatty acid alkyl esters which may be used in the process of the present invention are fatty acid methyl esters.

Preferably, the process is conducted under solvent-free conditions.

The fat substitute, or fat mimetics, of the present invention may be incorporated into a variety of foodstuffs and are useful as a replacement of at least a portion of the naturally occurring triglycerides. Representative foodstuffs which can contain the sorbitol ester in full or partial replacement for naturally occurring fats are: frozen desserts such as ice cream, frozen yogurt or milk shakes; puddings and pie fillings; margarine substitutes or blends; flavored bread or biscuit spreads; mayonnaise; salad dressings; salad oils, filled products such as filled cream or filled milk; cheeses; sour cream; snack food coatings; dairy or non-dairy cheese spreads; liquid or dry coffee lighteners; flavored dips; frying fats and oils; reformed and comminuted meats; meat substitutes and extenders; whipped toppings; compound coatings; soups, gravies, or sauces; frostings and fillings; cocoa butter replacements or blends; fat-containing candies such as those containing peanut butter or chocolate; and bakery products such as cakes, breads, rolls, pastries, cookies, biscuits and crackers. The fat mimetics of the present invention may also be used as a fat substitute in cooking or frying sprays used to coat utensils so as to result in a non-sticky surface.

The invention having been described in general terms, reference is now made to specific examples, it being understood that these examples are not meant to limit the present invention, the scope of which is determined by the appended claims.

EXAMPLE 1

Soybean Fatty Acid Ester of Sorbitol

A solution of 3.6 grams of potassium hydroxide and 200 grams of soybean oil fatty acid methyl esters in methanol was heated to reflux for two hours. With stirring, 13.4 grams of sorbitol and 3.0 grams of potassium carbonate were added and heating was continued, with a nitrogen purge to assist in removal of methanol by distillation. The temperature of the reaction mixture was increased to 155°–160° C. and pressure in the reaction vessel was reduced to about 10–15 mm Hg for about two hours, then to about 2 mm Hg for about two hours. The reaction mixture was allowed to cool to about 100° C., then vigorously stirred with water followed by saturated sodium chloride solution, then centrifuged. The resulting mixture had three layers: an oil layer on top, an aqueous layer on the bottom, and a thick soap in the middle. The oil layer was decanted from the soap, washed with methanol, and dissolved in hexane. The hexane solution was treated with activated carbon on a steam bath, filtered through Filtrol 105 (Harshaw-Filtrol-Englehard acid-activated clay adsorbent), and concentrated to approximately 110 grams of a golden yellow oil. About 15 grams of the oil was extracted with methanol overnight to remove excess fatty acid methyl esters. The purified oil was isolated and subjected to vacuum stripping to remove residual methanol, yielding 11.3 grams of sorbitol esters as a clear, golden yellow oil. By gas chromatographic analysis, the average degree of substitution was 5.1 fatty acid groups per sorbitol group.

EXAMPLE 2

Lipase Hydrolysis of Sorbitol Fatty Acid Ester

Extent of hydrolysis of the sorbitol fatty acid ester of Example 1 by a mixture of porcine enzymes was evaluated by the test procedure described below.

An enzyme solution was prepared by blending 1.5 grams of lipase Type II crude porcine steapsin (Sigma Chemical Company catalog number L 3136), 1.0 gram of procine pancreatin (Sigma P 1500), and 0.5 gram of porcine pancreatin (Sigma P 7545) with 100 milliliters of delomized water for 30 minutes in a blender, then filtering to obtain a clear solution.

To an accurately weighed 0.5–1 gram sample of the sorbitol fatty acid ester were added 5.0 milliliters of ethanol, 20 milliliters of a pH 9.0 aqueous solution containing 10% gum acacia and 2.5% sodium chloride, 20 milliliters of an aqueous solution containing 1% histidine monohydrochloride and 5.8% sodium chloride, and 0.5 milliliter of 45% calcium chloride solution. With vigorous stirring, the mixture was adjusted to pH 9.0 with 0.05N potassium hydroxide solution. Mixing was continued for 10 minutes to thoroughly emulsify the oil, and 0.5 milliliter of the above enzyme solution was added. With continued stirring, 0.05N potassium hydroxide solution was added at a rate sufficient to maintain pH 9.0. The rate of addition of the potassium hydroxide solution was monitored for 10 minutes. Rate of hydrolysis was calculated by the following equation:

$$\text{Lipase units per gram} = \frac{\text{Rate of KOH addition (ml/min)} \times 50}{\text{Weight of sample (grams)}}$$

Percent lipase hydrolysis, calculated as the ratio of rate of hydrolysis of the sorbitol fatty acid ester divided by rate of hydrolysis of a soybean oil standard, was 12.2 percent.

EXAMPLE 3

Sorbitol Sunflower Oil Fatty Acid Pentaester

A solution of 9.6 kilograms of potassium hydroxide (approximately 90% KOH) and 521.0 kilograms of sunflower oil fatty acid methyl esters in 146.0 kilograms of methanol was heated with stirring under nitrogen atmosphere to 68°–70° C. in a closed reactor under pressure (approximately 1.6–2.0 atmospheres) for 2 hours, then cooled to 60°–62° C. With stirring, 34.6 kilograms of sorbitol, 7.88 kilograms of potassium carbonate, and 1.84 grams of Dow Corning Type A food grade antifoam were added, heat was applied to distill methanol until the temperature of the reaction mixture reached 150° C., pressure in the reactor was reduced to 20 mm Hg, heating was continued until the temperature of the reaction mixture reached 175°–180° C., pressure was reduced to 5–10 mm Hg, and stirring was continued at 175°–180° C. for 4.5 hours. The reaction mixture was cooled to below 120° C. and transferred during 10–15 minutes to another reactor containing a stirred solution of 161.0 kilograms of 16% sulfuric acid in 674 kilograms of water under nitrogen atmosphere at 70°–75° C. The resulting mixture was heated to 85°–90° C., stirred for 10–15 minutes, adjusted to pH 0.75–1.25 with additional 16% sulfuric acid, and allowed to settle for 15 minutes. The lower aqueous layer was removed, and the remaining product layer was washed twice with 458 kilograms of water each time with adjustment of the pH of the aqueous phase to 0.75–1.50 with 16% sulfuric acid. Fatty acid methyl esters and free fatty acids were removed by distillation/steam stripping in a thin film evaporator. The residue was dissolved in 440 kilograms of hexane, the solution was treated with activated carbon and filtered, hexane was removed by distillation, the thin film distillation was repeated, and 1000 ppm of Tenox 20® antioxidant (Eastman Chemical Company, 20% TBHQ and 10% citric acid in propylene glycol) was added. The oil was washed three times with methanol, residual methanol was stripped under vacuum, 300 ppm of natural tocopherol antioxidant and 25 ppm of citric acid were added, and the oil was filtered through a 0.5 micron polishing filter. By HPLC, the product contained 6.1% sorbitol and sorbitol anhydride fatty acid triesters, 13.8% sorbitol tetraesters, 12.3% sorbitol anhydride tetraesters, 38.1% sorbitol pentaesters, and 29.8% sorbitol hexaesters. By calculation from these data, the average degree of substitution was 4.9.

EXAMPLE 4

Sorbitol Sunflower Oil Fatty Acid Pentaester

The procedure of Example 3 was followed, except that after the final vacuum stripping of residual methanol, an additional 1000 ppm of Tenox 20® antioxidant was added and the oil was filtered through a 0.5 micron polishing filter. By HPLC, the product contained 6.1% sorbitol and sorbitol anhydride fatty acid triesters, 13.4% sorbitol tetraesters, 12.5% sorbitol anhydride tetraesters, 37.8% sorbitol pentaesters, and 30.2% sorbitol hexaesters. By calculation from these data, the average degree of substitution was 4.9.

EXAMPLE 5

Sorbitol Sunflower Oil Fatty Acid Pentaester

The procedure of Example 3 was followed, with minor variations in final purification procedures, to produce 8 lots of sorbitol sunflower oil fatty acid pentaester ranging in weight from 14.8 to 24.4 kilograms, which were combined to give a single lot. By HPLC, the oil contained 6.1% sorbitol and sorbitol anhydride fatty acid triesters, 12.2% sorbitol tetraesters, 14.2% sorbitol anhydride tetraesters, 38.8% sorbitol pentaesters, and 28.5% sorbitol hexaesters. By calculation from these data, the average degree of substitution was 4.9.

EXAMPLE 6

Sorbitol Sunflower Oil Fatty Acid Pentaester

The procedure of Example 3 was followed, except that approximately 1200 kilograms of hexane were used for the carbon treatment step, and only a single addition of antioxidant was made; this consisted of approximately 430 ppm of Eastman Tenox GT-2 natural tocopherol and approximately 50 ppm of citric acid, added as a solution in propylene glycol. By HPLC, the oil contained 6.5% sorbitol and sorbitol anhydride fatty acid triesters, 17.3% sorbitol tetraesters, 12.6% sorbitol anhydride tetraesters, 38.8% sorbitol pentaesters, and 24.8% sorbitol hexaesters. By calculation from these data, the average degree of substitution was 4.8.

EXAMPLE 7

The procedure of Example 3 was followed, except that the final methanol extraction and addition of tocopherol antioxidant were not done. By HPLC, the oil contained 13% sorbitol and sorbitol anhydride fatty acid triesters, 18% sorbitol tetraesters, 13% sorbitol anhydride tetraesters, 37% sorbitol pentaesters, and 18% sorbitol hexaesters. By calculation from these data, the average degree of substitution was 4.6.

EXAMPLE 8

French Fried Potatoes

French fried potatoes were cooked in sorbitol sunflower oil fatty acid pentaester under conditions designed to model those encountered in commercial french-frying operations, whereby the same oil is used to cook a number of batches over an extended period of time. Thus, sorbitol pentaester prepared according to Example 4 was held at the cooking temperature (approximately 177° C.) for ten-hour periods on five consecutive days, and during each day, ten batches of potatoes were cooked at one-hour intervals. Frozen potatoes which had been par fried in partially hydrogenated soybean oil (Ore Ida Golden Crinkle French Fried Potatoes) were used in the tests. Fresh oil was added to the fryers as required to maintain the initial oil level, and the oil was filtered to remove food particles at the end of each day. Small samples of the oil for analysis (25 grams) were removed initially and at the end of the first, third, and fifth days. Foaming, free fatty acids, color development, and oil replacement levels were all within the normal range for commercial frying oils. Odor and taste of the fried potatoes was acceptable throughout the test. Fried potatoes from the end of the test period were somewhat greasy, but acceptable.

EXAMPLE 9

Potato Chips

Potato slices of uniform 0.050-inch thickness were soaked in water at room temperature for approximately 5 minutes, drained, patted dry with paper towels, and transferred to a wire basket which was immersed for 3 minutes in sorbitol sunflower oil fatty acid pentaester prepared according to Example 4, which had been heated to 180° C. During the frying operation, after 30 seconds, the potato slices were pushed to the bottom of the frying basket. At 1.5 minutes, the slices were released, stirred with a wooden spoon, then pushed to the bottom again. At 3 minutes, the basket was raised, allowed to drain over the hot oil for 2 minutes, and shaken to remove excess oil. The potato chips were then emptied onto a paper towel, allowed to cool, weighed, reheated in a microwave oven in two 45-second stages with intermediate venting of the oven, and salted by rolling in a plastic bag with 1.6% salt. The salted potato chips were judged by a taste panel to be acceptable.

EXAMPLE 10

Mayonnaise

| Ingredients | Weight, grams |
|---|---|
| Sorbitol sunflower oil fatty acid pentaester of Example 5 | 780 |
| Egg yolks | 60 |
| Water | 17.4 |
| Vinegar, 5% | 40 |
| Lemon Juice | 33 |
| Egg whites | 27 |
| Sugar | 20 |
| Salt | 13 |
| Mustard flour | 6.0 |
| Potassium sorbate | 1.0 |
| Sodium benzoate | 1.0 |
| Onion Powder | 0.8 |
| Garlic Powder | 0.4 |
| White Pepper | 0.4 |
| Total | 1000.0 |

In a food processor, a blend of the dry ingredients was added to the water, vinegar, lemon juice, egg whites, and egg yolks. Initial mixing was accomplished by mixing in three brief (approximately 1 second) pulses, the sides of the processor were scraped, the mixture was stirred for 3 minutes, and the sides were scraped again. The sorbitol pentaester was added through the feeder chute with stirring during a 2.5 minute period, the sides were scraped again, and the mixture was stirred for 10 seconds. The resulting mayonnaise was similar to mayonnaise made with soybean oil in appearance, rheology, texture, mouthfree, and pH. A slight but not unacceptable off-flavor was noted by taste panelists.

EXAMPLE 11

Italian Salad Dressing

| Ingredients | Percentage by weight |
|---|---|
| Sorbitol sunflower oil fatty acid pentaester of Example 5 | 48.7 |
| Vinegar, 5% | 25.0 |
| Water | 13.3 |
| Dry ingredients (Good Seasons Mild Italian dressing mix) | 13.0 |
| Totals | 100.0 |

The ingredients were transferred to a bottle and shaken vigorously until blended. The resulting dressing was similar in appearance, rheology, and taste to dressing made with soybean oil.

EXAMPLE 12

White Cake

| Ingredients | Weight, grams |
|---|---|
| Sorbitol sunflower oil fatty acid pentaester of Example 5 | 74.9 |
| Egg whites | 102.2 |
| Water | 294.0 |
| Cake mix (Betty Crocker Super Moist) | 528.9 |
| Totals | 1000.0 |

The ingredients were mixed with an electric mixer to form a batter, which was transferred to lightly greased 9-inch round Teflon-coated pans and baked in a 350° F. oven for 23 minutes. After cooling, the cake was 6% lower in volume and somewhat firmer than a control cake made with soybean oil, but equivalent to the control in sensory qualities.

EXAMPLE 13

Sugar Cookies

| Ingredients | Weight, grams |
|---|---|
| All-purpose flour | 255.5 |
| Sugar | 204.2 |
| Sorbitol sunflower oil fatty acid pentaester of Example 5 | 168.5 |
| Eggs | 102.1 |
| Double-acting baking powder | 9.15 |
| Salt | 4.58 |
| Vanilla extract | 4.05 |
| Cinnamon | 2.03 |
| Totals | 750.11 |

The sugar and sorbitol pentaester were mixed, followed by the eggs, vanilla extract, and remaining dry ingredients. Small portions of the resulting batter were dropped onto a lightly greased cookie sheet and baked 11 minutes at 375° F. The resulting cookies were equivalent in sensory properties to control cookies made with soybean oil.

EXAMPLE 14

Blueberry Muffins

| Ingredients | Weight, grams |
|---|---|
| Flour | 614.8 |
| Sugar | 267.2 |
| Baking powder | 48.0 |
| Salt | 8.0 |
| Milk | 447.8 |
| Egg whites | 133.6 |
| Sorbitol sunflower oil fatty acid pentaester of Example 5 | 200.0 |
| Blueberries | 280.6 |
| Totals | 2000.0 |

The liquid ingredients and all of the dry ingredients except the blueberries were mixed separately, then combined and mixed until homogeneous. The blueberries were then added and mixed in manually. The resulting batter was added to greased non-stick muffin cups, 150 grams per cup, and baked until done (30–35 minutes).

EXAMPLE 15

Human Toleration Study

Sorbitol fatty acid pentaester, consisting of 90% of the pentaester of Example 3 and 10% of the pentaester of Example 6, was well tolerated by adult human volunteers as part of the normal daily diet at levels of 15 and 30 grams per day (approximately one-third of the average adult total intake of dietary fat). No significant gastrointestinal effects were observed.

We claim:

1. A edible composition consisting essentially of a sorbitol fatty acid ester with a degree of substitution of about 5 fatty acid groups derived from a mixture of fatty acids, said composition useful as a low calorie fat substitute, said composition showing a rate of lipase hydrolysis of about 5% to about 30% of the rate of lipase hydrolysis of soybean oil.

2. A composition according to claim 1 wherein said degree of substitution ranges from about 4.5 to about 5.5.

3. A composition according to claim 1 wherein said degree of substitution is about 4.7.

4. A composition according to claim 1 in which said sorbitol fatty acid ester contains ester of sorbitol in an anhydride form.

5. A composition according to claim 1 wherein said rate of lipase hydrolysis is about 12%.

6. A composition according to claim 1 wherein the fatty acid groups of said fatty acid ester are selected from the group consisting of synthetic, natural, saturated, unsaturated, straight chain and branched chain fatty acids; and mixtures thereof.

7. A composition according to claim 1 wherein the fatty acid groups of said fatty acid ester are selected from the group consisting of butyric, caproic, caprylic, pelargonic, capric, undecanoic, lauric, myristic, palmitic, oleic, elaidic, myristoleic, palmitoleic, ricinoleic, erucic, stearic, arachidic, behenic, linoleic, linolenic, eleostearic, and arachidonic acids; fatty acid derivatives; and mixtures thereof.

8. A composition according to claim 1 wherein the fatty acid groups of said fatty acid ester are obtained from oils selected from the group consisting of non-hydrogenated, partially hydrogenated, or hydrogenated oils selected from the group consisting of soybean oil, safflower oil, sunflower oil, sesame oil, peanut oil, corn oil, olive oil, rice bran oil, canola oil, rapeseed oil, shea nut oil, babassu nut oil, coconut oil, palm kernel oil, cottonseed oil, and palm oil; butterfat; tallow, and lard; and mixtures thereof.

9. A composition according to claim 8 wherein the fatty acid group of said fatty acid ester is obtained from non-hydrogenated, partially hydrogenated, or hydrogenated soybean oil.

10. A triglyceride-containing foodstuff having at least a portion of the normally present triglyceride replaced by a sorbitol fatty acid ester with a degree of substitution of about 5 fatty acid groups to reduce the calories in the foodstuff without causing significant gastrointestinal symptoms when the foodstuff is consumed.

11. A foodstuff according to claim 10 in the form of a frozen dessert.

12. A foodstuff according to claim 10 in the form of a salad dressing or salad oil.

13. A foodstuff according to claim 10 in the form of a dip for crackers, chips or vegetables.

14. A foodstuff according to claim 10 in the form of a spread.

15. A foodstuff according to claim 10 in the form of a whipped topping.

16. A foodstuff according to claim 10 wherein said foodstuff is in the form of a triglyceride-containing confection.

17. A foodstuff according to claim 10 in the form of a frosting or icing for cakes or cookies.

18. A foodstuff according to claim 10 in the form of a filling for cakes or cookies.

19. A foodstuff according to claim 10 in the form of a whipped dessert, gelled dessert or pudding.

20. A foodstuff according to claim 10 in the form of a beverage.

21. A foodstuff according to claim 10 in the form of a shortening or frying oil.

22. A foodstuff according to claim 10 in the form of a soup, gravy or sauce.

23. A foodstuff according to claim 10 in the form of baked goods.

24. A foodstuff according to claim 10 in the form of a mayonnaise or imitation mayonnaise.

25. A foodstuff according to claim 10 in the form of a liquid or dry imitation dairy product.

26. A foodstuff according to claim 10 in the form of a liquid or plastic margarine spread.

27. A foodstuff according to claim 10 in the form of a pasta.

28. A foodstuff according to claim 10 in the form of a meat, poultry or fish analogue.

29. A foodstuff according to claim 10 in the form of a cooking or frying spray.

30. A foodstuff according to claim 10 in the form of a coating for snack foods.

31. A foodstuff according to claim 10 wherein at least a portion of said sorbitol fatty acid ester is in the anhydride form.

32. A method of reducing the fat content of a foodstuff containing triglycerides comprising replacing at least a portion of the normally present triglyceride by a composition comprising a sorbitol fatty acid ester with a degree of substitution of about 5 fatty acid groups without causing significant gastrointestinal symptoms when the foodstuff is consumed.

33. A method according to claim 32 wherein said foodstuff is in the form of a frozen dessert.

34. A method according to claim 32 wherein said foodstuff is in the form of a salad dressing or salad oil.

35. A method according to claim 32 wherein said foodstuff in the form of a dip for crackers, chips or vegetables.

36. A method according to claim 32 wherein said foodstuff is in the form of a spread.

37. A method according to claim 32 wherein said foodstuff is in the form of a whipped topping.

38. A method according to claim 32 wherein said foodstuff is in the form of a triglyceride-containing confection.

39. A method according to claim 32 wherein said foodstuff is in the form of a frosting or icing for cakes or cookies.

40. A method according to claim 32 wherein said foodstuff is in the form of a filling for cakes or cookies.

41. A method according to claim 32 wherein said foodstuff is in the form of a whipped dessert, gelled dessert or pudding.

42. A method according to claim 32 wherein said foodstuff is in the form of a beverage.

43. A method according to claim 32 wherein said foodstuff is in the form of a shortening or frying oil.

44. A method according to claim 32 wherein said foodstuff is in the form of a soup, gravy or sauce.

45. A method according to claim 32 wherein said foodstuff is in the form of baked goods.

46. A method according to claim 32 wherein said foodstuff is in the form of mayonnaise or imitation mayonnaise.

47. A method according to claim 32 wherein said foodstuff is in the form of a liquid or dry imitation dairy product.

48. A method according to claim 32 wherein said foodstuff is in the form of a liquid or plastic margarine spread.

49. A method according to claim 32 wherein said foodstuff is in the form of a pasta.

50. A method according to claim 32 wherein said foodstuff is in the form of a meat, poultry or fish analogue.

51. A method according to claim 32 wherein said foodstuff is in the form of a cooking or frying spray.

52. A method according to claim 32 wherein said foodstuff is in the form of a coating for snack foods.

53. A method according to claim 32 wherein at least a portion of said sorbitol fatty acid ester is in the anhydride form.

54. A process for preparing a mixture of sorbitol fatty acid esters and sorbitol anhydride fatty acid esters with a degree of substitution of about 5 fatty acid groups comprising: heating a mixture of sorbitol, an alkali metal fatty acid soap, an excess, based on the weight of sorbitol, of a fatty acid alkyl ester, and a basic catalyst, to a temperature and for a time sufficient to effect the desired degree of esterification and provide a low calorie fat substitute suitable for foodstuffs and exhibiting a rate of lipase hydrolysis of from about 5% to about 30% of the rate of lipase hydrolysis of soybean oil.

55. A process according to claim 54 wherein said basic catalyst is an alkali metal catalyst.

56. A process according to claim 55 wherein said alkali metal catalyst is selected from the group consisting of alkali metals, alkali metal hydrides, alkali metal hydroxides, alkali metal alkoxides and alkali metal carbonates; and combinations thereof.

57. A process according to claim 56 wherein said catalyst is selected from the group consisting of potassium metal, sodium metal, potassium hydride, sodium hydride, potassium hydroxide, sodium hydroxide, potassium methoxide, potassium ethoxide, potassium t-butoxide, sodium methoxide, sodium ethoxide, potassium carbonate and sodium carbonate; and combinations thereof.

58. A process according to claim 57 wherein said catalyst is selected from the group consisting of sodium carbonate and potassium carbonate; and combinations thereof.

59. A process according to claim 54 wherein said fatty acid alkyl ester is a fatty acid methyl ester.

60. A mixture of sorbitol fatty acid esters and sorbitol anhydride fatty acid esters having a degree of substitution of about 5 fatty acid groups prepared by the process of claim 54.

* * * * *